United States Patent
Heimberger et al.

(10) Patent No.: US 10,354,524 B2
(45) Date of Patent: Jul. 16, 2019

(54) METHOD FOR PROVIDING HEIGHT INFORMATION FOR AN OBJECT IN A SURROUNDING AREA OF A MOTOR VEHICLE ON A COMMUNICATION INTERFACE SENSOR DEVICE, PROCESSING DEVICE AND MOTOR VEHICLE

(71) Applicant: VALEO Schalter und Sensoren GmbH, Bietigheim-Bissingen (DE)

(72) Inventors: Markus Heimberger, Bietigheim-Bissingen (DE); Jean-Francois Bariant, Bietigheim-Bissingen (DE); Axel Durbec, Bietigheim-Bissingen (DE); Anto Michael, Bietigheim-Bissingen (DE)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 11 days.

(21) Appl. No.: 15/563,212

(22) PCT Filed: Mar. 30, 2016

(86) PCT No.: PCT/EP2016/056893
§ 371 (c)(1),
(2) Date: Dec. 28, 2017

(87) PCT Pub. No.: WO2016/156377
PCT Pub. Date: Oct. 6, 2016

(65) Prior Publication Data
US 2018/0165956 A1 Jun. 14, 2018

(30) Foreign Application Priority Data
Mar. 31, 2015 (DE) .................. 10 2015 104 940

(51) Int. Cl.
*G08G 1/0962* (2006.01)
*G06K 9/00* (2006.01)
(Continued)

(52) U.S. Cl.
CPC .......... *G08G 1/0962* (2013.01); *G01C 21/32* (2013.01); *G01S 15/025* (2013.01); *G01S 15/87* (2013.01);
(Continued)

(58) Field of Classification Search
USPC .................. 340/901, 937, 933, 436
See application file for complete search history.

(56) References Cited

U.S. PATENT DOCUMENTS

| 6,411,867 B1 * | 6/2002 | Sakiyama | B60Q 9/005 340/901 |
| 6,429,789 B1 * | 8/2002 | Kiridena | B60R 1/00 340/905 |

(Continued)

FOREIGN PATENT DOCUMENTS

| DE | 103 36 638 A1 | 2/2005 |
| DE | 10 2006 036402 A1 | 4/2007 |

(Continued)

OTHER PUBLICATIONS

International Search Report issued in PCT/EP2016/056893 dated Jun. 2, 2016 (3 pages).

(Continued)

*Primary Examiner* — Eric Blount
(74) *Attorney, Agent, or Firm* — Osha Liang LLP

(57) ABSTRACT

A method is provided for providing information about an object sensed in a surrounding area of a motor vehicle, in which the surrounding area is sensed using a sensor device of the motor vehicle. Additionally, a piece of information is provided on a communication interface in the motor vehicle.

(Continued)

A piece of height information for the object is stored as information in a sensor-device-end control unit and this information is provided on the communication interface connected to the sensor-device-end control unit for the purpose of transmission to and further processing with a further control unit of a processing device that comprises the two control units and that is configured to create a map of the surrounding area.

16 Claims, 2 Drawing Sheets

(51) Int. Cl.

| | | |
|---|---|---|
| *G08G 1/16* | (2006.01) | |
| *G01C 21/32* | (2006.01) | |
| *G01S 15/02* | (2006.01) | |
| *G01S 15/87* | (2006.01) | |
| *G01S 15/89* | (2006.01) | |
| *G01S 15/93* | (2006.01) | |
| *H04N 7/18* | (2006.01) | |

(52) U.S. Cl.
CPC .......... *G01S 15/89* (2013.01); *G01S 15/931* (2013.01); *G06K 9/00805* (2013.01); *G08G 1/16* (2013.01); *G08G 1/165* (2013.01); *G08G 1/166* (2013.01); *G08G 1/168* (2013.01); *G01S 2015/938* (2013.01); *H04N 7/181* (2013.01)

(56) References Cited

U.S. PATENT DOCUMENTS

| | | | |
|---|---|---|---|
| 9,100,554 B2* | 8/2015 | Barth | H04N 7/181 |
| 9,547,796 B2* | 1/2017 | Fukuda | B60R 1/00 |
| 2006/0095207 A1* | 5/2006 | Reid | G01S 11/12 |
| | | | 701/301 |
| 2012/0249794 A1* | 10/2012 | Kiyo | B60R 1/00 |
| | | | 348/148 |

FOREIGN PATENT DOCUMENTS

| | | | | |
|---|---|---|---|---|
| DE | 10 2006 049626 A1 | 4/2008 | | |
| DE | 10 2008 028222 A1 | 12/2009 | | |
| DE | 10 2009 045286 A1 | 4/2011 | | |
| DE | 10 2010 018 994 A1 | 11/2011 | | |
| DE | 102010018994 A1 * | 11/2011 | ........... | B60W 50/14 |
| DE | 10 2011 077333 A1 | 12/2012 | | |
| DE | 10 2012 208288 A1 | 11/2013 | | |

OTHER PUBLICATIONS

Written Opinion of the International Searching Authority issued in PCT/EP2016/056893 dated Jun. 2, 2016 (4 pages).
German Search Report issued in DE 10 2015 104 940.6 dated Dec. 18, 2015 (8 pages).

* cited by examiner

METHOD FOR PROVIDING HEIGHT INFORMATION FOR AN OBJECT IN A SURROUNDING AREA OF A MOTOR VEHICLE ON A COMMUNICATION INTERFACE SENSOR DEVICE, PROCESSING DEVICE AND MOTOR VEHICLE

BACKGROUND

The invention relates to a method for providing information about an object sensed in a surrounding area of a motor vehicle, in which the surrounding area is sensed using a sensor device of the motor vehicle. A piece of information is provided on a communication interface in the motor vehicle. Moreover, the invention relates to a method for producing a map of the surrounding area for a surrounding area of a motor vehicle, in which the map of the surrounding area is created on the basis of information that is sensed using a sensor device of the motor vehicle and is provided on a communication interface. Furthermore, the invention also relates to a computer program product. Further, the invention also relates to a sensor device for a motor vehicle, having at least one sensor and a control unit, wherein the sensor device is configured to provide information about an object sensed in a surrounding area of the motor vehicle on a communication interface in the motor vehicle. Moreover, the invention also relates to a processing device for producing a map of the surrounding area using a sensor device. Furthermore, the invention also relates to a motor vehicle having a sensor device and/or a processing device.

DE 10 2006 049 626 A1 discloses a method for determining the position and the geometric extent of an object in surroundings of a motor vehicle. The assignment of a measured value to a population of an object is performed therein using a gate method or using the Mahalanobis distance.

Furthermore, DE 10 2009 045 286 A1 discloses a method for mapping surroundings of a motor vehicle. In that case, there is provision for detected objects to be respectively described using two coordinate points and a positional fuzziness associated with the respective coordinate point. These coordinate points and the positional fuzziness are stored as data in an interface that can be accessed by the driver assistance system of the vehicle. So that the data can be used by driver assistance systems, a general object interface is necessary that can be used to describe the properties of the object.

The known methods allow the assessment of an affiliation of a sensing point only to a limited degree, which means that there is an accompanying applicable degree of inaccuracy. This is, particularly then, also disadvantageous for the actual object rating and hence also, consequently, for further statements, for example regarding a clearance between an object and the motor vehicle and/or regarding entry of such an object into a map of the surroundings. Not least, the provision of information on a cited interface in the prior art is worthy of improvement, since firstly there is only broad and fairly unspecific, fairly uncustomized, particularly in respect of further processing or forwarding, information on hand and secondly the evaluation complexity for the information that is already provided on this interface is relatively high.

The approach known from the prior art involves only relatively inaccurate information being provided for a very general interface. This results in the provided data on hand resulting in only relatively inaccurate statements about the object and therefore having only limited suitability for the further processing or use of driver assistance systems. Furthermore, a general interface of this kind that more or less already manages the actual connection to the rest of the vehicle network and hence also to the driver assistance systems with the controllers thereof has only conditional suitability. The reason is that an interface that therefore has disadvantages such as compatibility problems in regard to connection to other vehicle-manufacturer-specific controllers and networks can in this case be provided only globally for all the information to be provided that is on hand. Furthermore, the individual provision of information already preprocessed on an individual basis on this general interface is not possible. This also results in losses and compatibility problems when controllers for vehicles of different vehicle manufacturers are also meant to be connected to the communication interface.

SUMMARY OF DISCLOSURE

It is an object of the present invention to provide a method in which the provision of information about a sensed object in the surrounding area of the motor vehicle on an interface is made possible in a manner that better meets requirements. In that context, it is also an object of the present invention to provide a computer program product, a sensor device for a motor vehicle, a processing device for a motor vehicle and a motor vehicle in which this object is achieved.

A method according to the invention for providing information about an object sensed in a surrounding area of a motor vehicle involves such a piece of information being provided on a communication interface in the motor vehicle. A substantial concept of the invention can be seen as being that a piece of information that allows a higher degree of precision for and hence an improved assessment about the detected object is provided. Therefore, at least one piece of height information is stored as information in a sensor-device-end control unit. This information is then provided in this sensor-device-end control unit on the communication interface connected to the sensor-device-end control unit for the purpose of transmission to and further processing with a further control unit of a processing device that comprises the two control units and that is configured to create a map of the surrounding area.

The method according to the invention now makes it possible to generate a more specific piece of information in regard to an object and then provide this specific information such that it is available to a quite specific communication interface. The reason is that the communication interface, on which this individual information is then available, is not a general data interface that is the connection to the complete network of the vehicle, but rather, by contrast, is more or less another communication interface, particularly one connected upstream of such an interface. The reason is that it is developed and provided for connection such that a further control unit connected thereto is individually specified on a functional basis too. The reason is that this further control unit is affiliated, in that context, to an individually characterized processing device that, seen individually, is in turn configured on a functional basis to the effect that it uses the information provided on the communication interface and the information that is then additionally generated by the further control unit to create a map of the surrounding area. This map of the surrounding area can then in turn be transmitted to a network of the motor vehicle via a further data interface and can therefore also be made available to individual driver assistance systems. In particular, in that context, it is then also possible for a transmission to a display unit to be effected, where such a map of the surrounding area is then depicted so as to be visible to or viewable by a user too.

Such a method according to the invention now makes it possible to provide individual pieces of information in an individual conditioning or preprocessing stage on a quite specific communication interface in a manner substantially more in line with demand. Especially with the aim of then creating a more accurate map of the surrounding area from this information in conjunction with the control unit of the processing device, such a splitting approach in the method is particularly advantageous.

In particular, a probability statement concerning the probability with which the particular height is correct is produced as information and provided on the communication interface. As a result, a height indication is provided with a certain piece of probability information in respect of its correctness too, so that the accuracy of this height indication can be assessed in addition. Especially a specific piece of information of this kind about the height of the object also allows a more precise statement about the object and, in particular, also allows more accurate statements to be obtained in this regard too through further processing of the information. In particular, this then also allows more accurate statements to be made in respect of whether and if need be where an object needs to be entered into a map of the surrounding area.

In one advantageous embodiment, multiple height classes are prescribed, and an object is classified into a height class, the associated height class being stored as information on the height in the sensor-device-end control unit and being provided on the communication interface.

As a result of such a development, it is possible to attain an adequate height indication with significantly reduced processing complexity. By virtue of applicable classes being prescribed, it is no longer necessary for an exact height to be provided in an extensive and complex manner to a high level of detail. The computation complexity is significantly reduced as a result.

Preferably, a first height class is prescribed as "low", a second height class is prescribed as "high" and a third height class is prescribed as "object height not assessable". Such a split to just three classes once again backs up the aforementioned advantages. If it is possible to obtain a piece of height information with a specific probability, a distinction is then drawn just between a high object and a low object. If such a height indication cannot be established or cannot be established with adequate probability, then a classification for the object is grouped into the third height class, namely into the height class "object height not assessable".

In particular, a probability of a correctness of a classification of the object into at least one specific height class is produced and provided as information. This also then allows a certain accuracy statement to be added in addition to the classification, which accuracy statement permits what is then an even better assessment of the classification.

Preferably, when the object has a first probability of being classified into a height class and has at least a second probability of being classified into at least one further height class, the two probabilities are taken as a basis for deciding the height class into which the object is finally classified. This decision classification or this final classification is then stored as information in the sensor-device-end control unit and provided on the communication interface. In particular, this decision classification is also in turn provided with an accompanying probability value. Therefore, if situations arise in which there are nonnegligible probabilities of the object being able to be regarded both as low and as high, further clarification of the classification is performed. In particular, in this case too, this involves a certain weighting being performed on the basis of the respectively accompanying probabilities. Such a situation can arise particularly when the height of the actual object has been sensed and lies within a small tolerance range around a height threshold value that distinguishes between the height classes "low" and "high". Furthermore, such a situation can also arise when different multiple sensing points or measurement points are obtained from an object and, in this case too, there is then only a specific probability of being able to assess whether and which sensing points are from an object.

However, there may also be provision for when the object has a first probability of being classified into a first height class and has at least a second probability of being classified into at least one further height class, both classifications, particularly with the accompanying probabilities, to then be stored as information in the sensor-device-end control unit and to be provided on a communication interface. In an alternative development of this kind, the reason is that it is then possible to provide for supplementary information, which is then on hand in the further control unit of the processing device, for example, to be able to be taken as a basis for distinguishing which height classification is performed. Similarly, however, there may then also be situations in which both classifications have the accompanying probabilities of being processed further in the further control unit and of also being needed in this respect.

In particular, a classification into the "low" height classes is performed if the object can easily be driven over by the motor vehicle. In this regard, it may be prescribed that the object is lower than 25 cm and/or has a sensed geometry that is recognized as being able to be driven over.

In one advantageous embodiment, the control units of the processing device are connected to a bus of a communication interface for the purpose of data interchange.

In particular, a map of the surrounding area is created in the further control unit of the processing device on the basis of the information transmitted via the processing-device-internal communication interface.

The communication interface of the processing device is therefore configured only for data interchange between the control units of the processing device. In particular, this communication interface is not configured for data interchange with a processing-device-external unit, for example a network of the motor vehicle.

Preferably, the height information is provided in the sensor-end control unit in a data format with which the information of the sensor-end control unit is transmitted, compatibly for different further control units connectable to the communication interface, to the processing device configured to produce a map of the surrounding area, particularly is then processed further in said processing device. A specific data format of this kind therefore allows new information of a sensor device to be provided flexibly and in a manner more in line with demand.

Preferably, the control units of a processing device of the motor vehicle are assigned on a functional basis, and the processing device takes the information of the sensor device as a basis for creating or producing a map of the surrounding area, this being performed particularly in the further control unit.

There may be provision for the map of the surrounding area to be displayed on a display unit of the motor vehicle.

Moreover, the invention also relates to a method for producing a map of the surrounding area for a surrounding area of a motor vehicle, in which the map of the surrounding area is created on the basis of information that is sensed using a sensor device of the motor vehicle. A substantial concept of the invention can be seen as being that a piece of height information for the object is provided in accordance with the method according to the invention or an advantageous development thereof, as has been explained above, and is taken into consideration for producing the map of the surrounding area.

Moreover, there may be provision for the map of the surrounding area to be made available for use in a driver assistance system and not to be displayed further. However, there may also be provision for such a map of the surrounding area then to be graphically depicted on a display unit of the motor vehicle, so that a vehicle occupant can also see which objects are in the surrounding area of the vehicle. This may be advantageous particularly in the case of a driver assistance system configured as a parking assistance system when parking in a parking space or backing out of a parking space.

Moreover, the invention relates to a computer program product that is configured to carry out a method according to the aspects cited above when the computer program product is executed on a programmable computer device. The computer device is preferably arranged in the motor vehicle.

Moreover, the invention relates to a sensor device for a motor vehicle, having at least one sensor and a control unit, wherein the sensor device is configured to provide information about an object sensed in a surrounding area of a motor vehicle. The sensor device is furthermore configured to provide the information on a communication interface in the motor vehicle. There is provision for a piece of height information for the object to be stored as information in the sensor-device-end control unit, and for this information to be provided on the communication interface connected to the sensor-device-end control unit for the purpose of transmission to and for the purpose of further processing with a further control unit of a processing device that comprises the two control units and that is configured to create a map of the surrounding area.

Furthermore, the invention relates to a processing device having a sensor device according to the invention, and having a further control unit that is connected to the sensor-device-end control unit via a processing-device-internal communication interface, wherein the further control unit is configured, in particular, to create a map of the surrounding area on the basis of the information transmitted via the communication interface. The map of the surrounding area is then provided by the processing device.

It is particularly preferred for the further control unit to also be configured to receive and process information of a further sensor device that is functionally different from the sensor device, comprising the first control unit. As a result, the further control unit is also configured to create a map of the surrounding area, preferably on the basis of the information of the first sensor device and on the basis of the information of the information obtained directly from the further sensor device.

Advantageous embodiments of the method according to the invention can be regarded as advantageous embodiments of the processing device and of the motor vehicle. The substantive components of the processing device and of the motor vehicle are in this regard respectively configured to perform the respective method steps.

Moreover, the invention relates to a motor vehicle having a sensor device according to the invention and/or a processing device according to the invention.

Further features of the invention arise from the claims, the figures and the description of the figures. The features and combinations of features that are cited in the description above and also the features and combinations of features that are cited in the description of the figures below and/or as shown in the figures alone can be used not only in the respectively indicated combination but also in other combinations or on their own without departing from the scope of the invention. Therefore, embodiments of the invention that are not explicitly shown and explained in the figures, but emanate and are producible from the explained embodiments by virtue of self contained combinations of features, are also intended to be regarded as included and as disclosed. Embodiments and combinations of features that therefore do not have all the features of an independent claim as originally worded are also intended to be regarded as disclosed.

Exemplary embodiments of the invention are explained in more detail below with reference to schematic drawings

DETAILED DESCRIPTION

In the figures, elements that are the same or that have the same function are provided with the same reference symbols.

Figure 1:
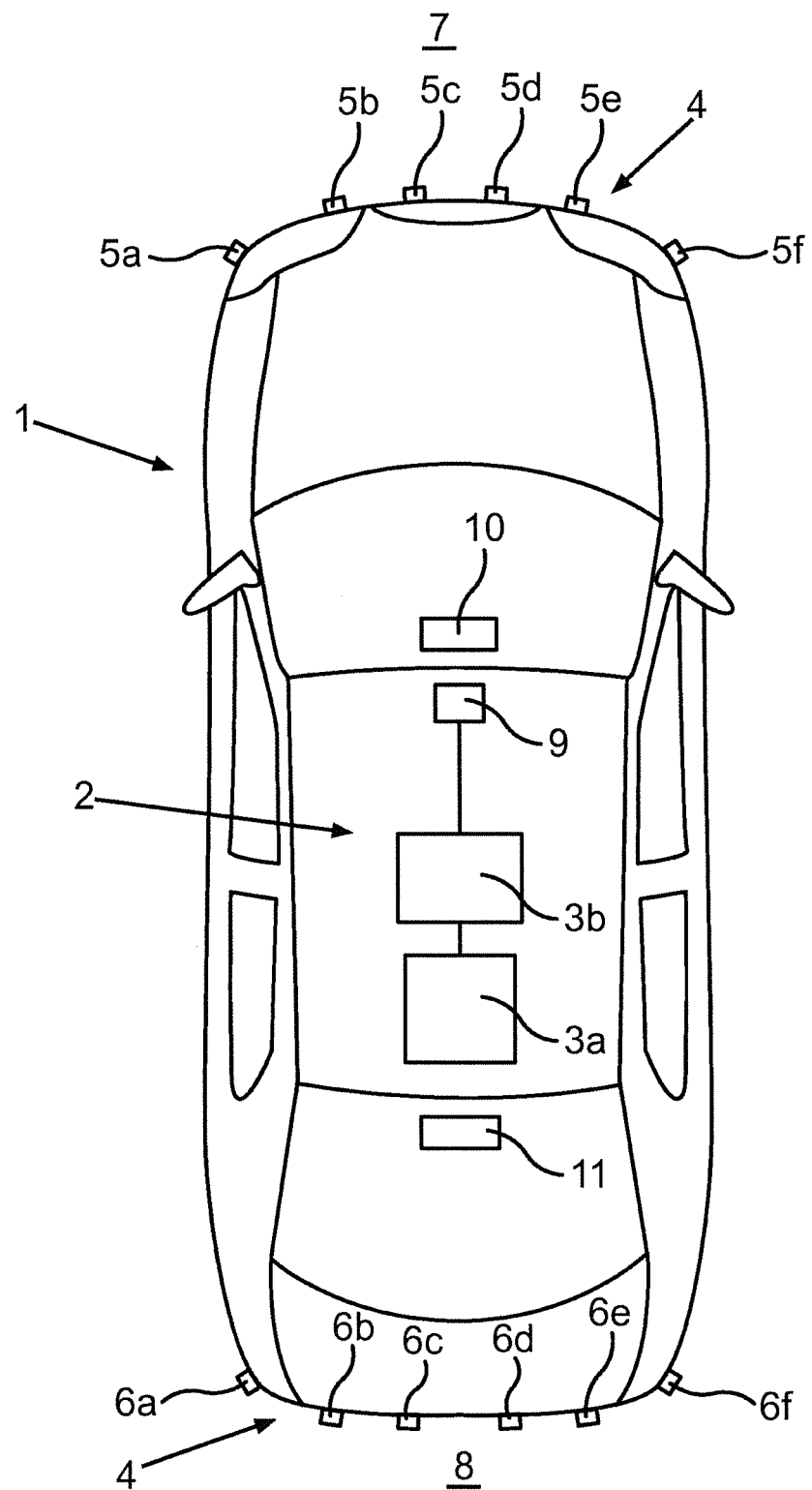
FIG. 1 shows a schematic plan view of an exemplary embodiment of a motor vehicle according to the invention with an exemplary embodiment of a processing device according to the invention.

FIG. 1 shows a schematic plan view depiction of a motor vehicle 1 that has a driver assistance system 2. The driver assistance system 2 may be a parking assistance system, for example.

The driver assistance system 2 comprises an evaluation device or processing device 12 (FIG. 2), comprising a first control unit 3a and a further control unit 3b, and an ultrasonic detection device 4 as first sensor device. In the exemplary embodiment, the ultrasonic detection device 4 comprises ultrasonic sensors arranged at the front of the motor vehicle 1. In this case, there are six ultrasonic sensors 5a, 5b, 5c, 5d, 5e and 5f in the exemplary embodiment. Furthermore, further ultrasonic sensors 6a, 6b, 6c, 6d, 6e and 6f are also installed in a rear area of the motor vehicle 1 in the exemplary embodiment. The front ultrasonic sensors 5a to 5f can be used to sense a front and lateral surrounding area 7. By contrast, the rear ultrasonic sensors 6a to 6f can be used to sense a rear and lateral surrounding area 8 of the motor vehicle 1. In this context, the ultrasonic sensors 5a to 5f and 6a to 6f are preferably arranged such that the entire surrounding area that is around the motor vehicle 1, and that is then composed of the surrounding areas 7 and 8, is sensed.

The motor vehicle 1 furthermore comprises a display unit 9 that can be used to provide graphical depictions. This display unit 9 can then be used to display particularly a map of the surrounding area or a map of the surroundings. In this case, the motor vehicle 1 is then also shown in this plan view depiction, for example, and the surrounding area is depicted, so that objects detected in the surrounding area 7 and/or 8 are also displayed and can be perceived by a vehicle occupant. This may be advantageous for a parking process or a backing-out process, for example.

The driver assistance system 2 makes it possible for objects that are in the surrounding area 7 and/or surrounding area 8 to be detected and also for the information obtained from ultrasonic sensors 5a to 5f and/or 6a to 6f to be able to be taken as a basis for making statements about the condition of such objects.

In particular, there is provision for the information of at least some ultrasonic sensors 5a to 5f and 6a to 6f to be processed in the processing device 12, which is particularly configured to create a map of the surrounding area.

In the exemplary embodiment, the motor vehicle 1 comprises not only the ultrasonic detection device 4, which is a first sensor device, but also at least one second sensor device, which operates in a functionally different manner from the first sensor device and, in the exemplary embodiment, is formed by a front camera 10 and/or a rear camera 11. The front camera 10 and/or the rear camera 11 likewise detect in the surrounding area 7 or in the surrounding area 8, so that they can also be used to sense objects.

Figure 2:
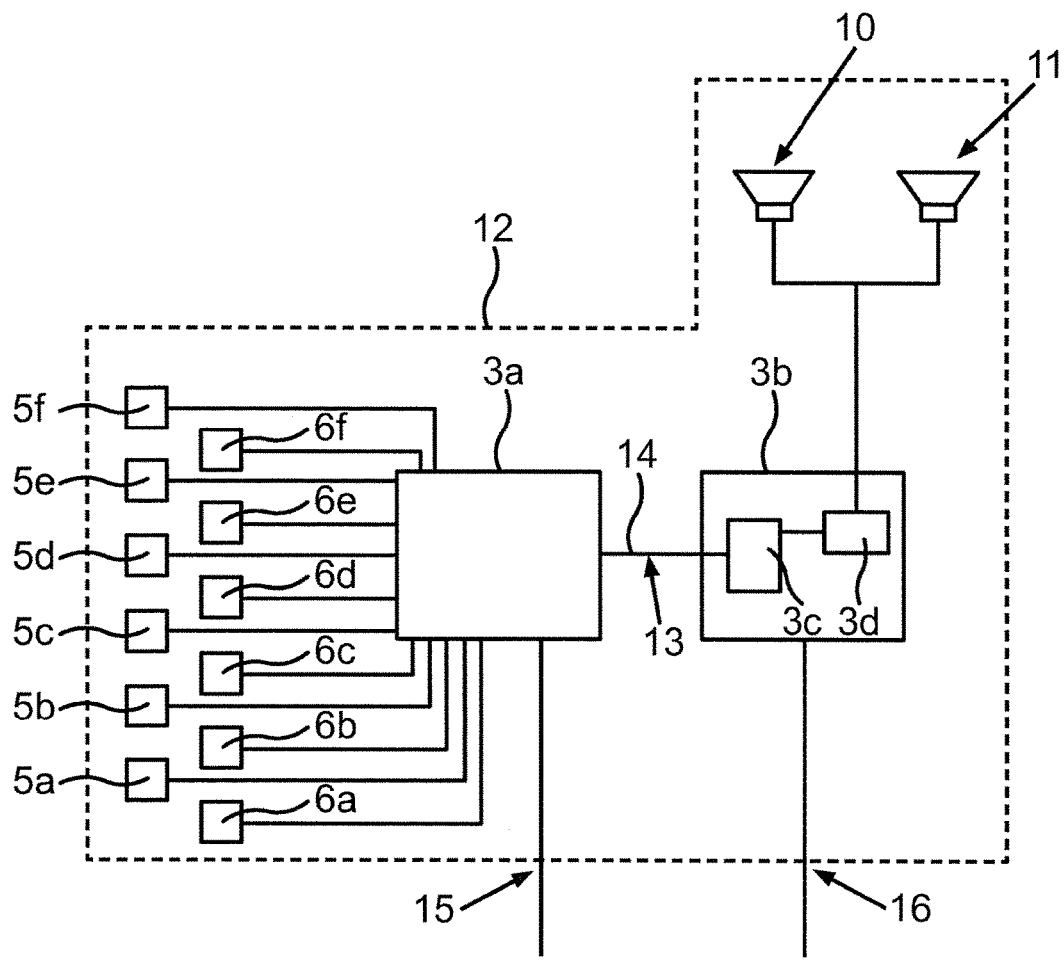
FIG. 2 shows a schematic depiction of an exemplary embodiment of a processing device according to the invention.

The sensor-device-end control unit 3a and the further control unit 3b, which is also a fusion control unit, are parts of the processing device 12, which is shown by way of example in FIG. 2. The processing device 12 is configured to produce a map of the surrounding area. The map of the surrounding area can be used as basic information for a driver assistance system, for example a parking assistance system. It can additionally also be displayed on a screen or the display unit 9.

The further control unit 3b is advantageously configured to process, or process further, not only information that it obtains from the sensor-device-end control unit 3a and hence the control unit that is affiliated to the ultrasonic detection device 4, but also information that it obtains from a sensor device that is functionally different therefrom, for example the front camera 10 and/or the rear camera 11. Since, in this context, the information of the different sensor devices is processed, particularly fused, the term fusion control unit is also intended to be understood accordingly.

In the depiction in FIG. 2, the control units 3a and 3b are connected by a communication interface 13 for the purpose of data interchange. This communication interface 13 comprises a bus 14 that is used to effect the data interchange between the control units 3a and 3b. This communication interface 13 is therefore a functional interface, and one that is exclusive to its units to be connected, that is affiliated to this processing device 12, which is configured on a functionally individual basis, namely to create a map of the surrounding area. The further control unit 3b comprises a processing unit 3c that processes the information transmitted by the control unit 3a further. This processing unit 3c is furthermore connected to a processor unit 3d, particularly a digital signal processor, of the further control unit 3b. In this processor unit 3d, the information obtained from the further sensor device, particularly the front camera 10 and/or the rear camera 11, is conditioned.

As can furthermore be seen, the entire processing device 12 is linked to a network of the motor vehicle via at least one further data interface 15, particularly via two further data interfaces 15 and 16. In the exemplary embodiment, there is provision for the sensor-device-end control unit 3a to be connected to the network directly via the data interface 15 and for the further control unit 3b to be connected directly to the network by the data interface 16, which is separate therefrom.

In the exemplary embodiment, the sensor device is the aforementioned ultrasonic detection device 4, which has not only the ultrasonic sensors 5a to 5f and 6a to 6f but also the sensor-end control unit 3a.

This specific information, which is stored in the sensor-device-end control unit 3a, is provided on this communication interface 13, which connects particularly only processing-device-internal units, in a specific data format, specifically such that it can easily be transmitted to and processed further in the further control unit 3b of the processing device 12, so as then to create the map of the surrounding area, in particular.

In this case, the data format is designed such that compatible further processing of the provided information can take place in different further control units. This is advantageous when the further control unit 3b is configured on a vehicle manufacturer individual basis, for example. The compatibility of this data format is therefore a substantial advantage in order to be able to produce the same structure for the processing device across vehicle manufacturers and still to be able to perform individual further processing of the information generated by the sensor-device-end control unit 3a.

As information, a piece of height information for an object in the surrounding area 7 and/or the surrounding area 8 is stored in the sensor-device-end control unit 3a and provided on the processing-device-internal communication interface 13, so that it can also be transmitted to the processing-device-internal further control unit 3b for the purpose of internal further processing in the processing device 12.

In particular, a probability statement concerning the probability with which the particular height is correct is also produced as information in this regard and provided on the communication interface 13. In particular, multiple height classes are defined and prescribed, with an object being classified into a height class and the associated height class being provided on the communication interface 13 as information on the height and therefore as height information. In particular, three height classes, namely the "low" height class, the "high" height class and the "object height not assessable" height class, are prescribed. Preferably additionally or instead, a probability of correctness of a classification of the object into at least one of these cited height classes is then provided as information on the communication interface 13.

Preferably, the decision classification is performed in the control unit 3a, and this decision classification, particularly the decision classification and/or an accompanying probability in regard to this classification, is provided on the communication interface 13. In this case, this determination of the decision classification is performed particularly in the sensor-device-end control unit 3a when the object has a first probability of being classified into a height class and has at least a second probability of being classified into at least one further height class.

However, there may alternatively also be provision for such multiple classification of an object into height classes with accompanying probabilities of the respective classification to involve this information then being provided on the communication interface 13 without a decision classification.

As can be seen from the depiction in FIG. 2, the communication interface 13 is provided merely for the purpose of data interchange between the processing-device-internal control units 3a and 3b. It therefore connects or allows a data interchange only between processing-device-internal units.

What is claimed:

1. A method for providing information about an object sensed in a surrounding area of a motor vehicle, comprising:
sensing the surrounding area using a sensor device of the motor vehicle; and
providing a piece of information on a communication interface in the motor vehicle,
wherein the piece of information is a piece of height information for the object that is stored as information in a sensor-device-end control unit,
wherein the height information is provided on the communication interface connected to the sensor-device-end control unit for the purpose of transmission to, and further processing with, a further control unit of a processing device that comprises both the sensor-device-end and the further control units,
wherein the further control unit is configured to create a map of the surrounding area, and
wherein a probability statement asserting a probability that the piece of height information is correct is produced and provided as part of the piece of information.

2. The method according to claim 1, wherein multiple height classes are prescribed, and the object is classified into one of the multiple height classes and the one height class is provided as height information.

3. The method according to claim 2, wherein a first height class is prescribed as "low", a second height class is prescribed as "high" and a third height class is prescribed as "object height not assessable".

4. The method according to claim 3, wherein a probability of a correctness of a classification of the object into at least one specific height class is produced and provided as height information.

5. The method according to claim 4, wherein when the object has a first probability of being classified into a height class and has at least a second probability of being classified into at least one further height class, the two probabilities are taken as a basis for deciding the height class into which the object is classified, this decision classification, particularly with the accompanying probability, then being provided as height information.

6. The method according to claim 4, wherein when the object has a first probability of being classified into a height class and has at least a second probability of being classified into at least one further height class, both classifications, particularly with the accompanying probabilities, are then provided as height information.

7. The method according to claim 1, wherein both the control units of the processing device are connected to a bus of the communication interface for data interchange, and wherein the map of the surrounding area is created in the further control unit on the basis of the height information transmitted via the processing-device-internal communication interface.

8. The method according to claim 1, wherein the height information is provided in the sensor-end control unit in a data format with which the information of the sensor-end control unit is transmitted compatibly for different further control units connectable to the communication interface and are processed further in said control units.

9. The method according to claim 1, wherein the control units of the processing device of the motor vehicle are assigned on a functional basis and the processing device takes the information of the sensor device as a basis for producing a map of the surrounding area.

10. The method according to claim 9, wherein the map of the surrounding area is displayed on a display unit of the motor vehicle.

11. A method for producing a map of the surrounding area for a surrounding area of a motor vehicle, comprising:
creating a map of the surrounding area on the basis of information that is sensed using a sensor device of the motor vehicle; and
wherein the map is created using a piece of height information for the object, obtained using the method according to claim 1.

12. A computer program product for carrying out a method according to claim 1 when the computer program product is executed on a programmable computer device.

13. A sensor device for a motor vehicle, comprising:
at least one sensor; and
a sensor-device-end control unit, wherein the sensor device is configured to provide information about an object sensed in a surrounding area of a motor vehicle on a communication interface in the motor vehicle,
wherein a piece of height information for the object is stored as information in the sensor-device-end control unit, and the piece of height information is provided on a communication interface connected to the sensor-device-end control unit for transmission to, and for the purpose of further processing with, a further control unit of a processing device that comprises both the sensor-device-end and the further control units,
wherein the further control unit is configured to create a map of the surrounding area, and
wherein a probability statement asserting a probability that the piece of height information is correct is produced and provided as part of the piece of information.

14. A processing device comprising:
a sensor device according to claim 13; and
a further control unit that is connected to the sensor-device-end control unit via a processing-device-internal communication interface, wherein the further control unit is configured to create a map of the surrounding area on the basis of the information transmitted via the communication interface,
wherein the map of the surrounding area is provided by the processing device.

15. The processing device according to claim 14, wherein the further control unit is also configured to receive and process information of a further sensor device that is functionally different from the sensor device, comprising the first control unit.

16. The motor vehicle having a sensor device according to claim 13.

* * * * *